Patented May 25, 1954

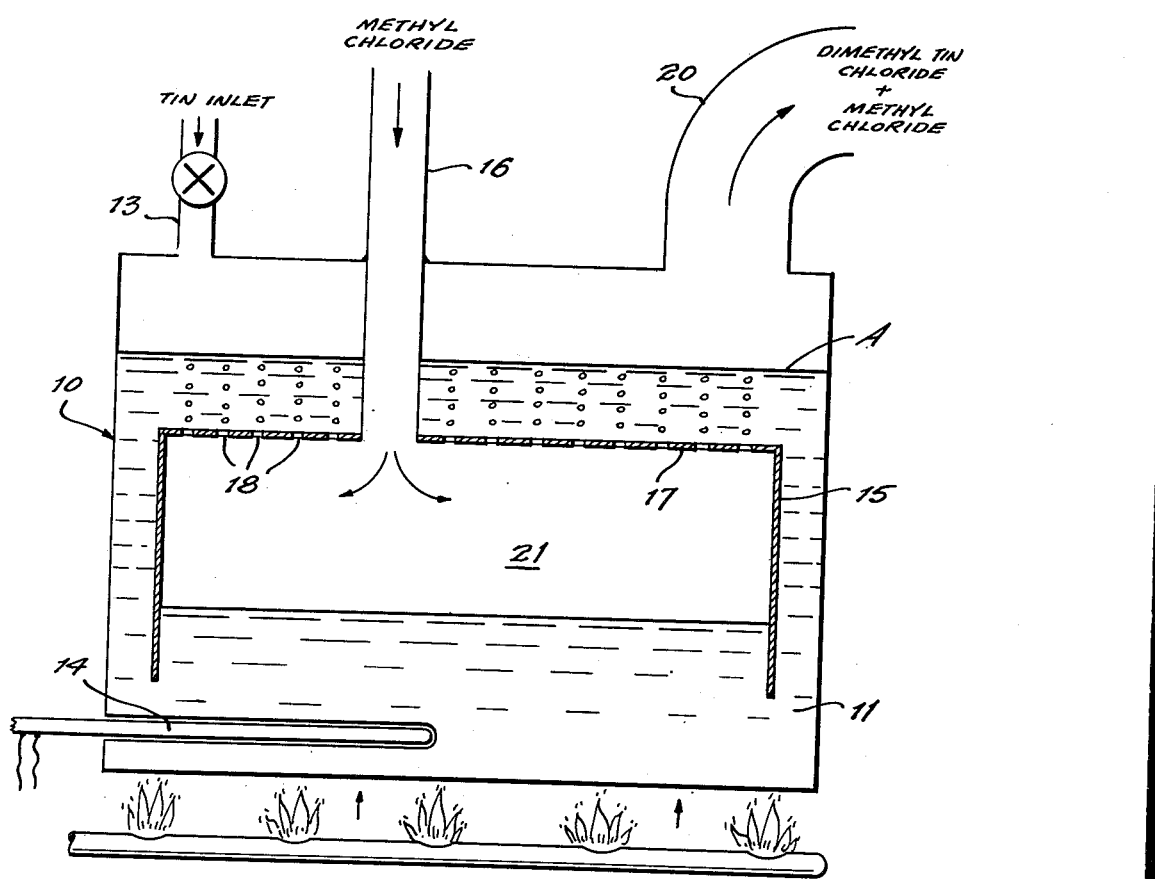

2,679,506

UNITED STATES PATENT OFFICE 2,679,506

PREPARATION OF DIMETHYL TIN DICHLORIDE BY DIRECT REACTION

Eugene George Rochow, Winchester, Mass., assignor to Metal & Thermit Corporation, New York, N. Y., a corporation of New Jersey Application May 17, 1951, Serial No. 226,914

9 Claims. (Cl. 260—429)

The present invention relates to the preparation of dimethyl tin dichloride.

Dimethyl tin dichloride has been found particularly useful in the preparation of derivatives serving as stabilizers for chlorinated organic materials such as vinyl chloride resins, chlorinated paraffins, etc. and as additives for petroleum. For example, the dimethyl tin dichloride may be employed to make dimethyl tin dilaurate by reaction of the dichloride with sodium laurate.

It has been determined in accordance with the present invention that advantageous yields of dimethyl tin dichloride may be produced by the direct reaction of molten tin and gaseous methyl chloride under comparatively high temperatures and moderate pressures. The rate of reaction is dependent on temperature up to a point where excessive methyl chloride decomposition sets in. The reaction is desirably carried out at a temperature of between 300° C. and 450° C. When carrying out the reaction without catalyst, a temperature of about 300° C. has been found suitable. For a catalyzed reaction, a temperature of about 350° C. is preferred.

No high pressure is required for the methyl chloride. Its pressure must be such as to allow it to be introduced with the molten tin below its surface and to bubble up through said tin to said surface. For that purpose, a pressure of about 60 pounds per square inch gauge has been found suitable.

In carrying out the process of the present invention, the gaseous methyl chloride is bubbled through the molten tin in a reactor by a continuous operation. The effluent gas contains a mixture of the excess unreacted methyl chloride and the reaction product dimethyl tin dichloride. These gases can be separated by condensation. The dimethyl tin dichloride condenses in a cool portion of the system as elongated colorless crystals which melt at 106° C. and boil at 189° C. These crystals are soluble in water, alcohol, benzene and hexane and can be recrystallized from toluene solution.

It has also been found in accordance with the present invention that the presence of copper promotes the reaction by its catalytic action. An additional trace of zinc is effective to promote catalytically the reaction. About 5 to 10% by weight of copper and .01 to 1% of zinc in the tin bath facilitate reproducibility and initiation of reaction.

It has also been determined in accordance with the present invention that if dimethyl tin dichloride is introduced into the reaction zone directly or by saturation of the methyl chloride gas stream, this dichloride will serve as an autocatalyst in facilitating the initiation of the reaction.

It has also been found that the presence of sodium during the reaction is detrimental and should be avoided. The presence of this metal in the reaction zone causes the formation of trimethyl tin monochloride rather than the dimethyl tin dichloride desired.

With the process of the present invention, technical methyl chloride could be used instead of the more expensive refrigeration grade containing less water. Although traces of water in the methyl chloride might cause the production of hydrochloric acid, this has no adverse effect on the reaction and on the contrary operates as a catalyst.

Various other features and advantages of the invention will be apparent from the following particular description and from an inspection of the accompanying drawing showing diagrammatically a form of apparatus which can be employed to carry out the process of the present invention.

Referring to the drawing, there is provided a reactor 10 which may be made of glass to avoid corrosion from stannous and cuprous chlorides formed during the reaction. If an iron reactor is used, the metal exposed to the tin-gas interface may require to be lined with a suitable protective material. A suitable lining material for the purpose would be an anti-corrosive alloy such for example as Hastelloy containing 90% nickel, 3% copper, 1½% aluminum and the rest mainly silicon.

The reactor 10 contains a body 11 of molten tin extending up to the level A therein and adapted to be introduced into the reactor through a pipe 13. The reactor 10 is heated by any suitable means (not shown) regulated automatically through thermostatic means in a thermo-couple well 14 extending into the tin bath 11. Immersed in the tin body 11 is an inverted box or case 15 having an inlet connection 16 for the gaseous methyl chloride gas stream and a top wall 17 with a series of holes 18. An outlet 20 leading from the head chamber of the reactor 10 serves as a discharge for the reaction product dimethyl tin dichloride and for the excess unreacted methyl chloride. An air condenser (not shown) in the outlet line 20 condenses the dimethyl tin dichloride in crystallized form.

In operation, the reactor 10 is preheated and loaded with well-drossed molten tin through the pipe at 350°–400° C. This loading operation is performed under the protective blanket of methyl chloride or nitrogen. Purging of the apparatus and the tin with hydrogen or nitrogen for a few hours speeds initiation of the reaction. The methyl chloride is introduced into the box 15 at a moderate pressure, as for example, about 60 pounds per square inch, to create a gas chamber 21 therein above the level of the tin in said box. The gas passes through the holes 18 in the box wall 17 and bubbles through the tin above said wall into the head chamber of the reactor 10. During the bubbling operation, a fraction of the methyl chloride reacts with the tin to form mainly dimethyl tin dichloride, a little monomethyl tin trichloride and a trace of trimethyl tin chloride. This reaction product and the excess unreacted methyl chloride gas are discharged through the outlet 20 to a separation point as described, where the dimethyl tin dichloride is condensed out of the exit gas stream. The exit gas, after being stripped of methyl tin compounds, is virtually unchanged methyl chloride which can be recycled.

The following examples illustrate certain ways in which the principle of the invention has been applied but these are not to be construed as limiting the broader aspects of the invention.

*Example 1*

A 500 ml. round bottom flask was fitted with a 360° C. thermometer, a 5 mm. gas inlet tube and a 5 mm. outlet tube passing into a West condenser. Mossy tin, 200 gm. and copper powder, 40 gm. were placed in the flask. The flask and its contents were heated to 300° C. Methyl chloride gas was then passed in at about 25 cc. per minute. In the course of 2–2½ hours, the temperature was raised to 320° C. and the gas flow rate had been increased to about 100 cc./minute. At about this time, white crystals were noticed in the condenser. The reaction was continued for an hour and additional crystals plus some liquid were condensed in the collection system. The crystalline condensate was identified as dimethyl tin dichloride.

*Example 2*

A glass reactor 50 mm. wide and 200 mm. high was provided with a 6 mm. gas inlet tube, thermometer well and a 20 mm. take-off tube at the top. It was wrapped with asbestos paper and provided with a Nichrome wire heating coil. This reactor was heated to 250° C. 992 gm. of molten Grade A tin, 99.2 gm. of reduced copper and 9.92 gm. of granulated zinc were added in that order. The reactor temperature was adjusted to 300–305° C. Methyl chloride gas was introduced at a rate of 7.5 cc./min. as indicated on a flowrator. In the first two hours, liquid was condensed in the air condenser attached to the reactor; after two hours, solid dimethyl tin dichloride was deposited in the condenser. A Dry Ice-kerosene cold trap was on the gas exit from the air condenser. The gas flow continued for 20 hours at 7.5 cc./min. and 28 hours at 11.25 cc./min., a total of 62.25 gm. being passed. 77 gm. of crude dimethyl tin dichloride were collected, corresponding to 35.35 gm. of methyl chloride. 28 gm. of methyl chloride were condensed in the cold trap. Thus a complete recovery of excess methyl chloride was obtained and a 56% conversion of methyl chloride to methyl tin compound was shown.

The reactor was run for an additional 48 hours at 15 cc./min. methyl chloride flow rate. The degree of conversion was 54.2%. At a methyl chloride flow rate of 100 cc./min., 77 gms. of crude dimethyl tin dichloride were obtained in 17 hours. Thus a 17.6% conversion of methyl chloride resulted.

Mass spectographic analyses of the methyl chloride gases directly from the cylinder and from the exit of the condenser showed that the exit gas was unchanged from the original methyl chloride.

*Example 3*

An all-iron reactor duplicating in dimensions and design the glass reactor in Example 1 was heated to 350° C. It was loaded with 990 gm. of molten Grade A tin, 99 gm. of reduced copper powder and 9.9 gm. of granulated zinc. The temperature was maintained at 300–5° C. Methyl chloride gas was passed in at a flow rate of 100 cc./min. In a 48 hour period, 212 gm. of crude dimethyl tin dichloride were collected in a condenser. A 17.1% conversion of methyl chloride resulted. 97% of the methyl chloride was accounted for as either product or useable exit gas.

*Example 4*

A two-liter glass resin flask was fitted with three gas inlet tubes, a thermocouple well and a product and excess gas exit to an air condenser. The flask was heated to a temperature above the melting point of tin. 6.5 kilograms of Grade A tin were introduced. 34 grams of dross were removed. 650 gms. of reduced copper powder and 65 gms. of granulated zinc were added. Hydrogen gas was bubbled through the reactor for 6½ hours. 1.3 grams of water were collected. Immediately after the hydrogen flow was stopped, methyl chloride gas was caused to flow through the three gas inlet tubes. In ten minutes, crystals of dimethyl tin dichloride were noted.

The average gas input rate was 263 cc./min. About 17% of this gas was converted to product. About 95% of the methyl chloride gas was accounted for as either product or excess methyl chloride. The average temperature of the reaction was 425° C. On running for 68 days, 15.4 kilograms of crude product were obtained. The reactor was opened after 16 days of operation and some slag was removed. 70% of the tin was converted to methyl tin compound. The tin in the residue and slag was recoverable.

*Example 5*

A resin kettle as described in Example 4 was loaded with 7.94 kilograms of well-drossed Grade A tin while under a hydrogen gas blanket. The reactor was completely assembled and the hydrogen was replaced by methyl chloride gas. The temperature at this time was 245° C. and the stabilized temperature of reaction was 385° C.

After 1¼ hours, no product had formed; but there was some gray powder (stannous chloride) in the condenser and a black scum on the surface of the tin. The reactor was opened and the scum was removed. Then, after reassembling kettle, 1.2 gm. of dimethyl tin dichloride were used to "seed" the reaction by dumping a little in each of the three gas inlet tubes. This material was almost immediately recovered in the condenser and the reaction started.

Dimethyl tin dichloride was produced at the rate of 2.9 gm./hr. for the first three hours. This rate increased to 5.2 gm./hr. for the next 24 hours and the increase in rate continued steadily for about 200 hours. At the end of 310 hrs., the reactor was producing product at a rate of 13 gm./hr. This work utilized a methyl chloride gas flow rate of 250 cc./min. At the end of 310 hrs., no scum had formed on the surface of the tin.

What is claimed is:

1. The process of making dimethyl tin dichloride, which comprises reacting methyl chloride directly with tin containing a trace of zinc.

2. The process of making dimethyl tin dichloride, which comprises reacting methyl chloride directly with tin in the presence of copper and zinc in catalytic amounts and in the absence of sodium.

3. The process of making dimethyl tin dichloride, which comprises reacting methyl chloride directly with molten tin containing 5 to 10% copper by weight and .01 to 1% zinc by weight.

4. The process of making dimethyl tin dichloride, which comprises bubbling methyl chloride through molten tin containing copper and zinc in catalytic amounts.

5. The process as described in claim 4, the reaction temperature being maintained at 300 to 450° C.

6. The process of making dimethyl tin dichloride, which comprises bubbling gaseous methyl chloride under moderate pressure through a body of molten tin at a temperature of 300 to 450° C. containing 5 to 10% copper by weight and .01 to 1% zinc by weight and in the absence of sodium.

7. The process of making dimethyl tin dichloride, which comprises continuously bubbling methyl chloride through molten tin containing copper and zinc in catalytic amounts and continuously subjecting the effluent gas to condensing temperature to separate the dimethyl tin dichloride from the excess unreacted methyl chloride.

8. The process of making dimethyl tin dichloride, which comprises bubbling methyl chloride and some dimethyl tin dichloride through molten tin during initial stages and subsequently discontinuing the bubbling of dimethyl tin chloride through the molten tin.

9. The process of making dimethyl tin dichloride, which comprises continuously bubbling gaseous methyl chloride and dimethyl tin dichloride through molten tin heated to a temperature of between 300° and 450° C. and containing 5 to 10% by weight of copper and .01 to 1% by weight of zinc, in the absence of sodium, after reaction has been initiated at substantial rate, discontinuing the bubbling of dimethyl tin dichloride through the tin and subjecting the effluent gas to a low temperature to condense the dimethyl tin dichloride from said gas.

References Cited in the file of this patent

UNITED STATES PATENTS

| Number | Name | Date |
|---|---|---|
| 2,444,270 | Rochow | June 29, 1948 |
| 2,625,559 | Smith | Jan. 13, 1953 |

OTHER REFERENCES

Krause: Die Chemie der Metal, Organischen Verbindungen, page 337, Edwards Brothers Inc., Ann Arbor, Michigan, 1943.